Patented May 7, 1946

2,400,000

UNITED STATES PATENT OFFICE 2,400,000

PRODUCTION OF ALUMINUM

Daniel Gardner, New York, N. Y., assignor to Gardner Thermal Corporation, a corporation of Delaware No Drawing. Application August 2, 1941,
Serial No. 405,214

3 Claims. (Cl. 75—68)

This invention relates to the production of aluminum, and more especially to a thermal process adapted to be performed in a substantially continuous manner for treating aluminum ores to extract the metal, preferably in a state of high purity. A high-temperature furnace is necessary, such as the electric furnace of Gardner Patent No. 2,195,453 of April 2, 1940; but with the present invention there will be a plurality of successive furnaces, or at least furnace chambers, to afford progressive treatments at different or ascending temperatures.

The usual prevailing system of aluminum extraction involves first the conversion of hydrated alumina, $Al_2O_3 \cdot 2H_2O$, contained in bauxite, into alumina, $Al_2O_3$; the powdered hydroxide being first digested with caustic soda, to form sodium aluminate, $NaAl_2O_4$, and out of the cooled solution aluminum hydrate crystallizes, which next is caused at white heat to lose its water, leaving the oxide, alumina. This in a molten cryolite bath at 1000° C. is electrolytically reduced, the alumina splitting and the molten metal collecting and being tapped off and cast into pigs, the metal yet requiring purification. Throughout the specification the centigrade temperature scale is used.

The process of the present invention is adapted for the treatment of various raw materials or ores, including bauxite and clays. The process is of commercial value in recovering the metal not only from alumina and from the hydroxide found in bauxite, but also from the silicate, found in clay, the sulfate $Al_2(SO_4)_3$, the aluminates such as calcium aluminate $CaAl_2O_4$, and other compounds, and in a special aspect spinel $Al_2O_3 \cdot MgO$, or mineral similarly containing compounds of aluminum and another metal or metals. In any case the process is radically distinguished from prevailing ones, and requires only thermal action.

There have already been described in certain British patents of this applicant processes for producing pure aluminum starting with alumina, or the sulfate, which may advantageously here be outlined since certain features thereof are employed as a desirable part of the present invention in some aspects. Thus in British Patent No. 482,150 of 1937 alumina is first converted to the nitride AlN, by heating with highly reactive carbon, in the form of lt°c (low-temperature-carbonization) coke, and with nitrogen gas, with evolution of heat. The nitride is then converted to the carbide $Al_4C_3$ by heating in a non-oxidizing atmosphere with lt°c coke, the carbon replacing the nitrogen, with evolution of heat. The carbide then readily splits or decomposes into the metal and carbon at a temperature above 1400°, with absorption of heat. The metal is then distilled off at above its boiling point of 1800° in a non-oxidizing atmosphere, and is finally condensed as the pure metal. In British Patent No. 501,233 of 1938 the alumina is first converted to the sulfide $Al_2S_3$ by heating with lt°c coke in the presence of vapor containing sulfur and at a temperature of above 1500°. The sulfide is next heated above the boiling point of aluminum, in the presence of iron or copper filings, or certain ferro-compounds, (preferably with lt°c coke and aluminum fluoride or other flux) whereby the sulfur combines with the iron or copper, leaving aluminum, which vaporizes and is drawn away for condensation. When starting with aluminum sulfate this is first converted by heating with lt°c coke to form the sulfide, and then proceeding as before.

The general object of the present invention is to afford a more widely available and commercially economic process for the production of aluminum from its plentiful and widely distributed ores.

A further object is to afford such a process by which the aluminum is recovered and obtained in a state of high purity, only minutely less than 100 percent, due to distillation in the final steps of recovery.

Another object is to afford a process for the recovery not only of the aluminum but of valuable other constituents of certain of the raw materials or ores.

Other and further objects and advantages will be made to appear in the hereinafter following description of illustrative embodiments and examples of the invention or will be understood by those conversant with the subject. To the attainment of such objects and advantages the present invention consists in the novel process of producing aluminum, and the novel features of method, step, reaction and treatment herein described or disclosed.

Assuming an ore with ample aluminum content, the aluminum compound, if not the oxide, may be first converted to the oxide or may in some cases be directly reduced. Preferably one or more of the following intermediate compounds of aluminum is involved at one stage or another in the present process, the carbide, sulfide or nitride, all mentioned in said British patents; this system requiring an efficient furnace preferably adapted to continuous operation as each successive unit or portion of the mixed raw materials advances progressively through the heating chambers or zones of the furnace or furnaces. The present invention differs from the processes of the British patents in various ways; such as the novel steps by which the carbide, however obtained, is caused to split or separate into the metal and other products; and such as the discovery that from certain raw materials two metals can be profitably separated and extracted, e. g. aluminum and magnesium from spinel, or aluminum and lithium from spodumene as will be hereinbelow described; and other features of treatment, reaction and step. Referring first to the step of obtaining the carbide, Moissan (C. R. 119, p. 935, 1894) has long since treated alumina in an electric furnace to obtain aluminum carbide, $Al_4C_3$, the reaction, which is endothermic, going as follows in a laboratory sense:

$$2Al_2O_3 + 9C \rightarrow Al_4C_3 + 6CO - 558.2 \text{ Cal.}$$

As known, alumina is hygroscopic, but it loses this property, and the water is driven out of the hydroxide, if calcined up to 850°. On the other hand, it was known that when heated up to 900° in an atmosphere of hydrogen, alumina may become partly reduced to metal. It has now been discovered however that better yields can be obtained if the temperature is lowered to about 700° and some powdered zirconium be introduced. Under these conditions zirconium hydride is formed and thus very large amounts of hydrogen are absorbed.

In carrying the present invention into practice the following general operations are required: the aluminum compound is first transformed preferably into aluminum carbide, and second, the carbide is broken up, at high temperatures, and the metal is heated above its boiling point whereby its vapors may be collected in a condensing chamber; the aluminum can be thus obtained of extreme purity, as high as 99.998% pure. In some cases it is preferable to obtain first the aluminum sulfide or nitride, rather than the carbide, in which case the compound is either first transformed into the carbide, or converted directly to the metal as will be further described. When converting by way of the sulfide stage, the sulfur also becomes duly removed and may be recovered.

The extraction of aluminum by the described process therefore involves passing from the original compound to one of the three oxygen-free compounds, carbide, sulfide or nitride, forming a group, and therefrom either by way of another of said group or directly to the metal state. The above outlined operations are carried out in at least two separate furnaces or chambers which are so combined, or connected in series, that the materials discharging from each are continuously transferred and fed into the next furnace. The two or more furnaces are preferably synchronized, and their respective lengths are so predetermined as to assure the time necessary, considering the speed of advancing travel, for carrying into effect the individual operations under most favorable conditions. The final furnace is connected for vapor flow to the condensing chamber, and all furnaces have the usual gas outlets for eliminating the waste gases.

In order to ensure the necessary intimate contact between the reacting substances the raw materials, ores, etc. are finely ground to a powdery condition, say to 60 mesh or even finer, and are well mixed, and the gaseous ingredients are properly introduced and distributed throughout the furnace space in order to avoid leakage and possible formation of explosive mixtures. Before putting a plant in operation, all air should be removed from the furnaces, since both furnaces must function in a non-oxidizing and preferably reducing atmosphere; but, if convenient, a strictly neutral atmosphere can be employed, with or without a continuous recirculation of the gases used; and these gases can be freed, if required, from the gases formed during the process, as by filtration, washing or scrubbing, in accordance with usual existing methods. The temperatures selected for each of the furnaces depend upon the materials used, but in all usual cases the second furnace is to function at a higher temperature than the first to bring about the complete breakdown of the carbide and the distillation of the metal.

Before explaining more in detail the process, some fundamental data are stated concerning the metal aluminum and its oxide, sulfide, carbide and nitride.

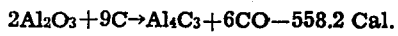

| Compound | M. W. | D | M. P. | B. P. | Heat of formation (Cal.) | Specific heat |
|---|---|---|---|---|---|---|
| | | | Degrees | Degrees | | |
| Al | 26.97 | 2.7 | 658.7 | 1,800 | | 0.214 |
| $Al_2O_3$ | 101.94 | 3.6 | 2,050 | 2,250 | 399.1 | .198 |
| $Al_2S_3$ | 150.12 | 2.02 | 1,100 | 1,550 | 344.8 | .165 |
| $Al_4C_3$ | 143.88 | 2.4 | d 1,400 | d | 81.5 | .049 |
| AlN | 40.96 | 3.05 | 2,200 | d 2,200 | 131.4 | .067 |

Referring now to these aluminum compounds other than the oxide, as seen from this table, the carbide is stable up to 1400°, at which it tends to decompose, probably due to the fact that the excess carbon present prevents obtaining a definite melting point. At still higher temperatures a progressive breakdown of the carbide occurs, resulting at a certain temperature in a complete disintegration of the compound, whereby the metal at 1800° is enabled to distill off. Aluminum nitride has a definite melting point, but similarly starts disintegrating at temperatures above 2200°. Aluminum sulfide has definite melting and boiling points, and can therefore, if desired, be distilled. These three compounds are oxygen-free compounds of aluminum; and they are free also of magnesium, silicon, calcium, etc. occurring in the raw minerals.

In certain cases it may be helpful to introduce a flux into the mixture to be treated in order to thin down the reacting materials. Such a flux must, however, be such as not to enter into reaction with the aluminum compounds, but is added solely for establishing a closer contact between the ingredients. Fluorides, such as those of aluminum, sodium or barium, or the double fluorides, such as cryolite, are particularly suitable for this purpose.

The reactive carbon used in the process must be of good purity and especially free from phosphorus. As already suggested in said British patents lt°c coke is particularly suitable for efficiently reacting with the alumina which, as above stated, should not have been dead burned or calcined. If such a coke is not available, then ordinary means of activating high grade coke or other carbonaceous matter should be adopted, since the high reactiveness of the carbon used is of greatest importance for the most successful operation in the first furnace.

Regarding the furnaces, one or both can be arranged either in a vertical or other position, provided no leakage can take place and the successive steps of the process are carried out in a continuously closed system.

For optimum completeness of reaction and rate of production it is highly important to ensure the prompt starting of the reactions in each process chamber, especially in the step of splitting an aluminum compound, as the carbide, to yield the metal; and it is therefore preferable to include in the original powdery mixture an agent, which may be termed a starter, or booster, functioning to promote the quick commencement of the reaction and its continuance in each successive portion of the advancing materials, as will be further below disclosed.

Some practical examples will best illustrate the preferred methods of procedure, under the present invention.

*Example A*

Alumina, which has not been calcined to the higher temperatures, is intimately mixed after previous crushing with reactive carbon, such as lt°c coke, and any other desirable agents, such as a reaction promoter. This mixture is then gradually fed, preferably while under stirring agitation, to the furnace and is caused to travel horizontally, downwardly or otherwise, while being passed into and through the hot chamber or zone of the first electric furnace. Through the heated zone is flowed a stream of non-oxidizing gas, as hydrogen or carbon monoxide or both, or a hydrocarbon such as methane. The temperature in this first furnace should not exceed about 1350° and preferably is maintained somewhat lower than this temperature, as between about 1100° and 1350°.

During this operation aluminum carbide is formed as already described, and this intermediate product is thereafter transferred, or caused to advance, without any possible outside contacts, into the second furnace.

In the second furnace, in a similar atmosphere or gas stream, the aluminum carbide is heated to a higher temperature as about 1750° suitable to cause the carbide fully to break up. Moissan has shown (C. R. vol. 119, p. 16, 1894) that aluminum carbide splits up in an electric arc furnace as follows:

$$Al_4C_3 \rightarrow 4Al + 3C - 81.5 \text{ Cal.}$$

Furthermore it has been known that by heating aluminum carbide with cupric oxide to about 1770° metal is obtained as follows:

$$3CuO + Al_4C_3 \rightarrow 4Al \cdot 3Cu + 3CO - 106.9 \text{ Cal.}$$

A similar reaction takes place when the cupric oxide is replaced by ferric oxide:

$$Fe_2O_3 + Al_4C_3 \rightarrow 4Al \cdot 2Fe + 3CO - 92.6 \text{ Cal.}$$

This reaction takes place at about 1790° when the above reactions between aluminum carbide and the cupric or ferric oxides respectively are carried out in presence of a bath of molten copper or iron, and alloys are obtained, in which more than 90% of the aluminum contained in the carbide is set free and is taken up by the molten metal.

It has now been discovered that the temperature of the molten bath may be kept higher, say at 2100° to 2200°, and that then the total amount of the aluminum is set free, and the aluminum becomes distilled off for collection in the condensing chamber, where the vapors of the metal are continuously condensed as by introduction into a molten bath of aluminum, preferably in presence of a suitable flux, such as a fluoride of sodium, calcium, magnesium or the like.

In order to promote an exothermic reaction, it is possible to vary the process by mixing carbides of aluminum with iron carbide, or the carbides of aluminum and calcium, and to work in a current of hydrogen gas. Thus:

$$Al_4C_3 + Fe_3C + 8H_2 \rightarrow 4Al \cdot 3Fe + 4CH_4 + 10.0 \text{ Cal.}$$
$$Al_4C_3 + CaC_2 + 12H_2 + C \rightarrow 4Al + Ca + 6CH_4 + 18.5 \text{ Cal.}$$

As a variation of the method involving contact action between aluminum carbide and ferric oxide, it is possible so to select the conditions in the molten metal bath, that the reaction becomes exothermic, with a surplus of free carbon present, namely:

$$Al_4C_3 + Fe_2O_3 + 22H_2 + 11C \rightarrow$$
$$4Al \cdot 2Fe + 3CO + 11CH_4 + 17.2 \text{ Cal.}$$

It should be said that under these conditions the carbon which is present in excess becomes graphitized.

Reverting to the reduction of $Al_4C_3$ apart from other metal compounds it is found to be possible to split it by passing through the heated aluminum carbide a current of carbon monoxide:

$$Al_4C_3 + 4CO \rightarrow 4Al + 2CO_2 + 5C + 1.6 \text{ Cal.}$$

The aluminum obtained by the several reactions in Example A is of great purity and could if desired be supplementally distilled in order to obtain a metal of highest purity, such as 99.998%.

When the process passes through the nitride or sulfide state in yielding the carbide or metal, less of the lt°c coke is needed to form the nitride, more for the sulfide and a much larger proportion for producing the carbide.

*Example B*

High grade clay is first treated in a known or suitable manner in order to convert the aluminum silicate to the hydroxide, which, upon heating it to 300°, loses two of its three molecules of water, and at 360° loses the last molecule of water, thus decomposing into $Al_2O_3$.

Anhydrous alumina so obtained is thereupon treated with a sulfur compound in order to obtain aluminum sulfide. This can be done in the furnace in different ways, e. g. by sulfidizing alumina with carbon disulfide, as follows:

$$Al_2O_3 + 2CS_2 \rightarrow Al_2S_3 + SO_2 + CO + C + 69.4 \text{ Cal.}$$

Or the reaction may be as follows:

$$2Al_2O_3 + 3CS_2 \rightarrow 2Al_2S_3 + 3CO_2 + 240.6 \text{ Cal.}$$

Or the alumina may be mixed with reactive carbon and exposed to a continuous stream of sulfur vapors, with the following reaction:

$$Al_2O_3 + 3S + 3C \rightarrow Al_2S_3 + 3CO + 32.9 \text{ Cal.}$$

Aluminum sulfide thus obtained is highly hygroscopic and no leakage of air or moisture into the furnace atmosphere is permissible. Upon producing the aluminum sulfide in the first furnace it must be converted into a more stable compound, or else promptly reduced to the metal, for example by the steps indicated in said British Patent No. 501,233.

Another way to reduce the aluminum sulfide to metal possessing certain advantages, is as follows. The aluminum sulfide is mixed with aluminum carbide and the two heated to a temperature above 1650°, in a current of hydrogen with the following reaction:

$$Al_2S_3 + Al_4C_3 + 9H_2 \rightarrow 6Al + 3H_2S + 3CH_4 - 340.3 \text{ Cal.}$$

As seen, this reaction is endothermic and the temperature must therefore be closely watched and maintained. If no hydrogen were passed, then the reaction may be conducted as follows by supplying sulfur, preferably as a gas:

$$Al_2S_3 + Al_4C_3 + 3S \rightarrow 6Al + 3CS_2 - 492.3 \text{ Cal.}$$

According to this equation the sulfur is readily recovered; and it has been possible to ascertain that the losses in sulfur are negligible.

Aluminum sulfide can also be treated with aluminum nitride for a yield of the metal, by maintaining a temperature somewhat above 2400°, in a current of hydrogen as follows:

$$Al_2S_3 + AlN + 9H \rightarrow 3Al + NH_3 + 3H_2S - 436.5 \text{ Cal.}$$

Aluminum metal in these several methods can be distilled off in the final furnace or chamber and obtained in a very high degree of purity.

As is known, aluminum nitride is efficiently obtainable by heating a mixture of alumina and carbon in a current of nitrogen as follows:

$$Al_2O_3 + 3C + N_2 \rightarrow 2AlN + 3CO - 57.0 \text{ Cal.}$$

When mixed with carbon aluminum nitride at elevated temperatures yields aluminum carbide as follows:

$$4AlN + 3C \rightarrow Al_4C_3 + 2N_2 - 312.7 \text{ Cal.}$$

Mixed with aluminum carbide aluminum nitride, when submitted to a temperature above 2400° decomposes, whereby the metal is obtained, which can be distilled off, thus:

$$Al_4C_3 + 2AlN \rightarrow 6Al + N_2 + 3C - 344.6 \text{ Cal.}$$

By heating it in a gaseous current composed of a mixture of hydrogen and nitrogen, aluminum nitride can be split up with formation of the metal vapors, thus:

$$AlN + 39H + 6N_2 \rightarrow Al + 13NH_3 + 10.3 \text{ Cal.}$$

Excellent results are obtainable by mixing the nitride and carbide of aluminum with a slight excess of carbon and treating the mixture in a current of hydrogen at about 2500° with reaction as follows:

$$AlN + Al_4C_3 + 47H + 8C \rightarrow$$
$$5Al + 11CH_4 + NH_3 + 8.1 \text{ Cal.}$$

Some of the above equations yield ammonia as a byproduct. It has heretofore been proposed to utilize aluminum nitride for the production of ammonia, as by the so-called "Serpek method"; but said method did not succeed practically, for one reason because no suitable furnace was then known which would permit continuous treatment of the nitride for the purpose.

*Example C*

This example illustrates the novel feature of industrially recovering both aluminum and another metal or metals from certain raw materials; and it embodies the discovery that two important metals can both be profitably extracted, separately, from the ores. In this first instance of such principle the mineral spinel is the starting material.

Spinel, an aluminate of magnesium, of the formula $MgO \cdot Al_2O_3$, has a density of 3.5 to 4.1, and a hardness of 8, the same as topaz, with a melting point of 2350°. It may contain up to about 17 percent of magnesium and 38 percent of aluminum, as obtained from Madagascar.

This mineral can be treated successfully according to this invention, for separately extracting both its aluminum and magnesium. It is a fact herein utilized that whereas aluminum can readily form its carbide, magnesium does not form a carbide. Several different methods of procedure have proved successful, of which two are described as follows:

(a) The mineral spinel is finely ground and, as in the treatment of MgO in Gardner Patent No. 2,147,645 of February 21, 1939, it is first sulfidized, raising the temperature however somewhat higher than the 1200° there suggested, in order to secure the formation of aluminum as well as magnesium sulfide. Thereupon these sulfides are transferred or advanced into the second furnace, and mixed with a carbide, preferably aluminum carbide. The mixture is now raised to about 1350° or above the boiling temperature of magnesium, this step being carried out in a constant current of hydrogen. The MgS decomposes and the metal then vaporizes and passes out for condensation. Now, freed of its magnesium, the mixture of aluminum sulfide and carbide is preferably transferred into a third furnace in which the temperature is maintained sufficiently high, as somewhat above 2100°, to ensure the breakdown of the aluminum carbide with liberation of the aluminum vapors. This reaction is also carried out in a current of hydrogen, and the conversion of both the sulfide and the carbide to the metal may be in the manner already stated above.

(b) It is also possible with this invention to apply the method of direct action of reactive carbon on powdered spinel. Under these conditions, in the first furnace or chamber, in a current of hydrogen or a suitable hydrocarbon gas, and at a suitable temperature as about 1250°, aluminum carbide is formed, whereas the magnesium metal vaporizes, to be conducted away and, at least in part as the metal, collected in a condensing chamber, preferably containing a suitable flux, such as a fluoride or a mixture of fluorides, in order to protect the condensing vapors from secondary reactions. To the extent that the Mg may be oxidized it may be immediately treated to reduce it again, e. g. as in Gardner Patents 2,147,645 of 1939 or 2,132,408 of 1938. From this first furnace the remaining solid matter, which should always contain a surplus of reactive carbon, is conveyed into a second furnace, through which also a current of hydrogen is passed. In this second furnace a temperature is upkept at a higher level, as well above 1400°, in order to assure the complete breakdown of the aluminum carbide. If this temperature be above 1800°, otherwise in a later chamber heated thereabove, the aluminum is caused to boil and its vapors are collected in a separate condensing chamber, with or without the presence of a flux.

In any case the vapors of either aluminum or magnesium, or both, can, if desired, be introduced into molten baths of other metals within a condensing chamber, whereby direct production of various alloys is rendered possible.

Other aluminates containing important metals, can with adaptations be treated by this method; for the recovery of each metal. Lithium and aluminum, for example can be separately recovered from a suitable raw material, as described in the next example.

*Example D*

Spodumene, a mineral of the spinel type containing lithia, alumina and silica, $$Li_2O \cdot Al_2O_3 \cdot 4SiO_2$$

may have an average of 4 to 8 percent of lithia, of sufficient value to recover. The mineral has a hardness of 7, as does quartz, a density of 3, and a melting point of 1950°.

For treatment according to the present invention, crushed spodumene is mixed with reactive carbon and introduced into a furnace along with a current of hydrogen and heated up to a temperature above the boiling point 1336° of the metal lithium. Under these conditions the lithium oxide is converted and decomposed and the metal distills over and is recoverable separately from the aluminum.

However it may occur that in the condensing chamber in the absence of control, lithium hydride LiH is formed. This is preventable by the precaution of maintaining the temperature at least up to 1000°. Lithium hydride may form but it melts at 680°, whereupon it decomposes. The formation of the hydride is in practice no great objection, since the material can at will be remelted and the metal, if need be, redistilled. No formation of lithium carbide $Li_2C_2$ is to be feared, since on heating to a temperature beyond 900° in the presence of hydrogen carbon is practically liberated, as shown by Guntz and Benoit (C. R. 176, p. 970 of 1923). The lithium therefore can easily be freed of any traces of hydrogen and carbon when necessary.

After the lithium is distilled away the remain-material is transferred into a second furnace, in which at a higher temperature the aluminum is liberated and distilled off, in the manner already described.

In all cases the metal aluminum is obtainable by this invention in very great purity, and can in any case be directly alloyed with other metals if so desired, as already described.

Auxiliary feature

For better starting, and for boosting the speed of, the reactions described or any of them, performed in a high temperature furnace, a suitable agent is added to and included in the mixture which contains any one or more of the aluminum compounds mentioned. This step is found to promote the initiation of each reaction and the efficiency of the conversions involved in the reactions, thereby improving substantially the completeness of the reactions and the rate of output in a given plant of the desired metal or metals. The process being continuous, this supplemental feature and advantage may be considered as applying in turn to each successive portion or unit of the mixture, as it advances through the reaction zone.

For these purposes an effective promoting agent consists in a small proportion either of finely crushed or powdery aluminum, or of one or another of the metals to be produced; this agent to be initially distributed throughout the mixture. Aluminum is typical, and its use is found to start and promote the desired reactions in a smoother and speedier manner, thus materially improving the process as a whole. The action by which the promoting agent performs its function is strictly of a pyrogenetic nature, the agent entering into a reaction with evolution of heat.

Taking powdered aluminum as a typical promoting agent this preferably is added and mixed thoroughly with the initial mixture, before passing to the first furnace. It may be in a small percentage of the weight of the raw material, preferably a fraction of one percent. The percentage of the added agent may be as low as about 0.1 percent, and as high as about 0.5 percent, while any higher proportion would be excessive and therefore wasteful although not impeding the efficiency of the promoting action.

This feature of the invention is of especial value for those described reactions which are of endothermic character, and wherein adequate thermal energy must be provided to carry the reaction efficiently through. Taking for example the case of the step of splitting aluminum carbide, wherein a high proportion of reactive carbon is employed, it is believed that the powdery aluminum, fed into the furnace in mixture with the aluminum carbide and the carbon, tends to combine with the carbon with the development of heat. Thus the heating action of the furnace is amplified by the interiorly developed heat, which serves to start the reactions with greater certainty and intensity and to carry them through for the attainment of the operations and results already described.

The auxiliary agent added for the purposes described may be referred to as a pyrogenetic promoter, the principle of which can be applied in any one of the various species of process hereinabove disclosed. The agent is a finely divided or powdery metal, and in the production of aluminum should be powdered aluminum, and it should be included in the original mixture to be treated. The heat generating action results from the combination of the small percentage of the aluminum with another agent present, notably the carbon which is a part of the treated mixture in many of the described embodiments; and in cases where carbon is not otherwise a necessary component of the mixture it should be added along with the aluminum powder, thus presenting the conditions under which, when the elevated temperatures are applied, combination will occur and internal heat will be generated. Thus this feature is of important utility in starting, boosting and promoting the main reactions, especially in those cases where there is difficulty in maintaining throughout the mass of material the high temperature necessary for the main reaction. Metals other than aluminum may serve, calcium being an instance, as in reducing aluminates containing calcium, but not magnesium, this not having the ability of combining with carbon; so that for greatest purity of product in the production of aluminum, the ideal promoting agent is aluminum itself.

In any case the addition of the auxiliary metal, especially in the case of aluminum powder added to assist in the reduction of aluminum carbide, affords not merely the heat-generating action described but, by its thorough distribution usefully enhances the electrical and thermal conductivity of the mixture. This is more particularly useful in the case of Al carbide, which is of low conductivity, and which is thus difficult of electrical heating; and the operation is greatly assisted by the added ingredient, whether remaining in the solid state or whether becoming vaporized in the mixture, as metallic aluminum does at the temperature of 1800°, with good conducting properties. In both of these ways, therefore, the development and spread of internal heat and temperature are rendered more expeditious and effective, for the improvement and quickening of the general process.

There has thus been described a thermal process for aluminum production, in several variations, embodying the principles and attaining the objects of the present invention. Since many matters of step, reaction and treatment may be variously modified within the principles of the invention, it is not intended to limit the patent thereto except so far as recited in the appended claims.

What is claimed is:

1. The continuous thermal process for the industrial production of aluminum from a starting aluminum compound comprising its oxide in finely divided condition, carried out by a sequence of hot treatments during progressive advance in a non-oxidizing atmosphere at progressively ascending temperatures; comprising converting the starting compound into one of the oxygen-free compounds of the group consisting of the carbide, nitride and sulfide, by highly heating the same in the presence of carbon, nitrogen or sulfur agents reacting to produce such intermediate compound, and thereupon by high-temperature treatment causing the reduction of such intermediate compound directly to yield aluminum, and finally at a temperature well above 1800° vaporizing the aluminum and distilling it away for separate condensation in pure form.

2. The continuous thermal process for the industrial production of metallic aluminum and byproduct metal from a starting aluminum compound in finely divided condition, carried out by a sequence of hot treatments during progressive advance in a non-oxidizing atmosphere at progressively ascending temperatures; such starting compound being a spinel containing aluminum oxide combined with the oxide of another light metal of the group consisting of magnesium and lithium; and such process being adapted to extract and recover separately the aluminum and other components in metal form, and comprising heating the spinel with a converting agent, of the group consisting of carbon and sulfur to convert the aluminum and other metal compounds to separate oxygen-free compounds, raising the temperature further, in hydrogen atmosphere to a temperature below about 1400° in a succeeding chamber, until the compound of the other metal decomposes and until the other metal vaporizes for separate condensation, and therebeyond at a yet higher temperature causing the decomposition of the aluminum compound, and finally at a temperature raised well above 1800° vaporizing the aluminum and distilling it away for separate condensation in pure form.

3. The thermal process as in claim 2 performed in an electric furnace, and wherein there is included in thorough mixture with the starting materials and reactive carbon of an auxiliary agent consisting of powdered aluminum; in the order of one percent or less by weight, adapted to combine exothermally with the carbon present in the mixture and thus generate internal heat promotive of high temperatures and assisting a main or endothermic reaction of the process, while by its distribution throughout the materials being treated substantially improving the conductivity of the mixture and thus cooperating in the electric heating of the mixture.

DANIEL GARDNER.